United States Patent [19]

Jenkner

[11] Patent Number: 4,911,281
[45] Date of Patent: Mar. 27, 1990

[54] SYSTEM FOR SORTING A SUBDIVIDED PLATE WORKPIECE

[76] Inventor: Erwin Jenkner, Lindenstr. 13, D-7261 Gechingen-Bergwald, Fed. Rep. of Germany

[21] Appl. No.: 306,839

[22] Filed: Feb. 3, 1989

Related U.S. Application Data

[63] Continuation-in-part of Ser. No. 48,015, May 8, 1987, Pat. No. 4,833,954.

[30] Foreign Application Priority Data

| May 20, 1986 | [DE] | Fed. Rep. of Germany | 3616954 |
| May 26, 1986 | [DE] | Fed. Rep. of Germany | 3617678 |
| Jun. 13, 1986 | [DE] | Fed. Rep. of Germany | 3619945 |
| Jun. 23, 1986 | [DE] | Fed. Rep. of Germany | 3620998 |

[51] Int. Cl.$^4$ .......................................... B65G 37/00
[52] U.S. Cl. ..................................... 198/364; 198/365; 198/370; 198/372; 414/280
[58] Field of Search ............... 198/362, 364, 365, 370, 198/372; 83/156, 158, 155.1, 404, 404.2, 27; 414/280, 560, 561, 661

[56] References Cited

U.S. PATENT DOCUMENTS

| 817,643 | 4/1906 | Hussey | 414/560 |
| 3,557,940 | 1/1971 | Rogers et al. | 198/370 X |
| 3,593,869 | 7/1971 | Harvey et al. | 414/560 X |
| 3,656,636 | 4/1972 | Konstantin | 198/370 X |
| 3,927,755 | 12/1975 | Ritola | 198/370 |
| 4,256,214 | 3/1981 | Balk, Jr. | 198/370 X |
| 4,316,565 | 2/1982 | Hodgkinson et al. | 198/370 X |
| 4,317,397 | 3/1982 | Ess . | |
| 4,341,135 | 7/1982 | Ufermann et al. . | |
| 4,381,686 | 5/1983 | Ess . | |

FOREIGN PATENT DOCUMENTS

| 2145011 | 5/1972 | Fed. Rep. of Germany . |
| 2702725 | 4/1978 | Fed. Rep. of Germany . |
| 1388713 | 3/1975 | United Kingdom . |

Primary Examiner—Robert J. Spar
Assistant Examiner—James R. Bidwell
Attorney, Agent, or Firm—Herbert Dubno; Andrew Wilford

[57] ABSTRACT

A workpiece subdivided into a plurality of pieces ordered in closely juxtaposed rows is deposited on a stripping tray at an upstream end of a longitudinal path with the rows extending generally perpendicular to the direction and then an upstream edge of the tray carrying the subdivided workpiece is positioned above an upper surface of one of a plurality of distributing units spaced longitudinally along the path and a stripping bar vertically closely juxtaposed with the tray and extending transversely across the tray immediately downstream of the subdivided workpiece is shifted into engagement with the leading edge of the subdivided workpiece on the tray to slide the trailing row of pieces off the tray onto the surface positioned thereunder. The tray is then displaced downstream and stopped with its trailing edge above each of the other distributing units thereon and the deposition step is repeated to deposit on each of the units a respective row of the pieces. Immediately after each unit receives the respective row of pieces, its upper surface is vertically shifted from an upper position immediately beneath the level of the stripping tray to a lower position and then the upper surface is shifted transversely to displace at least one of the respective row of pieces transversely and transfer same to respective longitudinally spaced takeoff conveyors adjacent the path and having upper surfaces at the lower level.

5 Claims, 4 Drawing Sheets

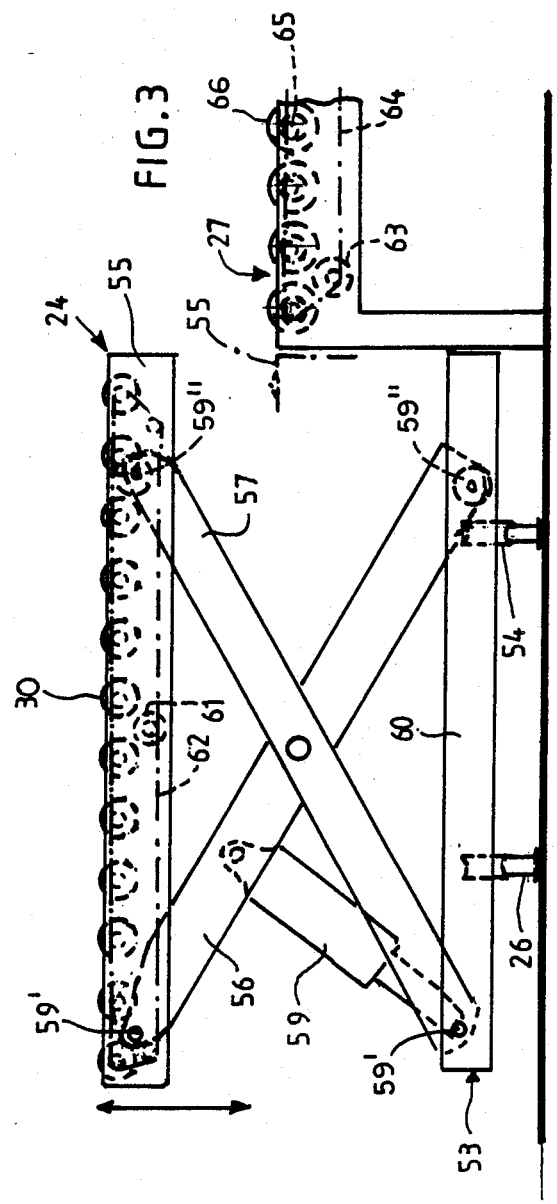

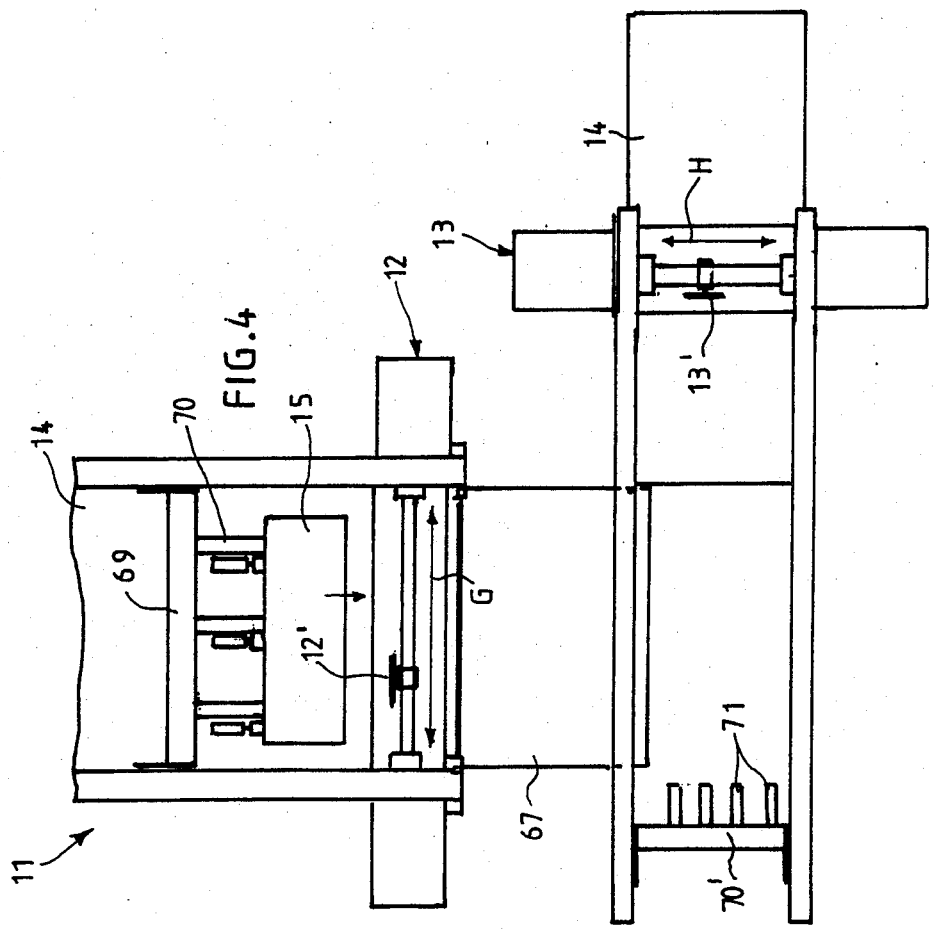

SYSTEM FOR SORTING A SUBDIVIDED PLATE WORKPIECE

CROSS-REFERENCE TO RELATED APPLICATION

This application is a continuation-in-part of my copending patent application 048,015 filed 08 May 1987, now U.S. Pat. No. 4,833,954.

FIELD OF THE INVENTION

The present invention relates to the subdividing and sorting of plate workpieces. More particularly this invention concerns a method of and apparatus for sorting to a plurality of destination locations the pieces of a longtudinally and transversely subdivided plate workpiece.

BACKGROUND OF THE INVENTION

It is standard, as for example seen in U.S. Pat. Nos. 4,317,397 and 4,381,686 both of Wilfried Ess, to cut a plate workpiece (which can be a single rectangular panel of a stack of identical such panels) into a plurality of pieces (which can also be a stack of such pieces) lying in closely juxtaposed parallel rows. The individual pieces which may all be of different widths and lengths are then sorted and sent to different destinations for use in different parts of a manufacturing operation and small pieces may be sent to a specific scrap-disposal location.

In German published patent application 2,702,725 also of W. Ess (filed with a claim to an Austrian priority of 10 Apr. 1976) a system is described wherein the subdivided workpiece is deposited on a stripping tray that can move past a vertically displaceable distributing table so that the individual pieces can be moved off one at a time. A roller conveyor moves the pieces in turn from the distributing table to a plurality of different outfeed conveyors.

Such an arrangement requires that the entire system be unloaded before the stripping tray can be reloaded. Thus its cycling time is relatively long. In addition in this arrangement the time to displace the shortest piece must be set to be equal to that of the longest piece, so that in general the sorting and distributing is very slow.

OBJECTS OF THE INVENTION

It is therefore an object of the present invention to provide an improved sorting and distributing system for a subdivided plate workpiece.

Another object is the provision of such an improved sorting and distributing system for a subdivided plate workpiece which overcomes the above-given disadvantages, that is which operates quickly.

A further object is to provide an improved method of and apparatus for sorting and distributing a subdivided workpiece wherein it is possible to reload the intake element of the machine, normally the stripping tray, even before the various pieces of the previous workpiece are all at their destinations.

SUMMARY OF THE INVENTION

An apparatus for sorting individual pieces of a subdivided plate workpiece from one another and for delivering the individual pieces to respective different destinations has a stripping tray displaceable in a longitudinal direction along a distributing path between an upstream end and a downstream end and a conveyor for depositing on the stripping tray a workpiece subdivided into a plurality of pieces ordered in closely juxtaposed transverse rows extending generally perpendicular to the direction. A stripping bar is vertically closely juxtaposed with the tray and extends transversely across the tray immediately downstream of the subdivided workpiece and a plurality of distributing units spaced longitudinally along the path each have an upper surface positioned in an upper position immediately beneath the level of the stripping tray. The stripping tray is displaceable past and over the distributing units. A plurality of longitudinally spaced takeoff conveyors adjacent the path have upper surfaces that are alignable with the upper surfaces of the respective distributing units, normally by vertical displacement of the surfaces of the units. Actuators are provided for relatively longitudinally displacing the tray and the stripping bar for engaging the stripping bar against the leading edge of the leading or furthest downstream transverse row of pieces and for pushing the subdivided workpiece on the tray toward and past the trailing upstream end of the stripping tray. Thus when the upstream tray edge is above one of the distributing-unit upper surfaces the upstream or trailing row of pieces is deposited thereon. A controller is connected to the stripping tray, bar, units, conveyors, and actuators for positioning the upstream edge of the stripping tray above the upper surfaces of the units and thereafter relatively displacing the tray and bar to push the upstream transverse rows off onto the unit upper surfaces. The units are similarly displaceable to move the respective upper surfaces toward the takeoff conveyors after deposition of rows of pieces thereon for moving the respective rows of pieces from the units to the conveyors.

According to a further feature of this invention the upper surfaces of the takeoff conveyors are lower than the upper surfaces of the units in the upper position and the unit upper surfaces are displaceable into a lower position level with the surfaces of the conveyors. The distributing units can therefore displace their respective upper surfaces into the lower positions after receiving a row of the pieces. This makes it possible for the stripping tray to move back into its starting position while the distributing units are still unloading their pieces.

In addition according to this invention for at least one of the distributing units there are a plurality of such takeoff conveyors and the one distributing unit is displaceable longitudinally between positions aligned transversely with the respective takeoff conveyors. Thus this one distributor is aligned with the respective takeoff conveyors to move the upper surface of the one unit to transfer the respective pieces one each to the respective takeoff conveyors.

The method of this invention therefore comprises the steps of depositing on a stripping tray at an upstream end of a longitudinal path a workpiece subdivided into a plurality of pieces ordered in closely juxtaposed transverse rows extending generally perpendicular to the direction and then positioning an upstream edge of the tray carrying the subdivided workpiece above an upper surface of one of a plurality of distributing units spaced longitudinally along the path and shifting a stripping bar vertically closely juxtaposed with the tray and extending transversely across the tray immediately downstream of the subdivided workpiece into engagement with the leading edge of the subdivided workpiece on the tray to slide the trailing row of pieces off the tray onto the surface positioned thereunder. The tray is then displaced downstream and stopped with its trailing edge above each of the other distributing units thereon and the deposition step is repeated to deposit on each of the units a respective row of the pieces. Immediately after each unit receives the respective row of pieces, its upper surface is vertically shifted from an upper position immediately beneath the level of the stripping tray to a lower position and then the upper surface is shifted transversely to displace the respective row of pieces transversely and transfer same to respective longitudinally spaced takeoff conveyors adjacent the path and having upper surfaces at the lower level.

With this system, therefore, it is possible for the stripping tray to drop off its load of pieces one row at a time and then to immediately return to its starting position where it can be reloaded. The individual rows are themselves broken up into individual pieces immediately after being deposited, so that at any one time several different sorting and distributing operations are going on. The cycle time is therefore cut by a large factor.

DESCRIPTION OF THE DRAWING

The above and other objects, features, and advantages will become more readily apparent from the following, reference being made to the accompanying drawing in which:

FIG. 3 is a larger-scale end view of the portion of the apparatus indicated by and taken in the direction of arrow III of FIG. 2; and FIG. 4 is a larger-scale top view of the detail indicated at IV in FIG. 1.

SPECIFIC DESCRIPTION

Figure 1:
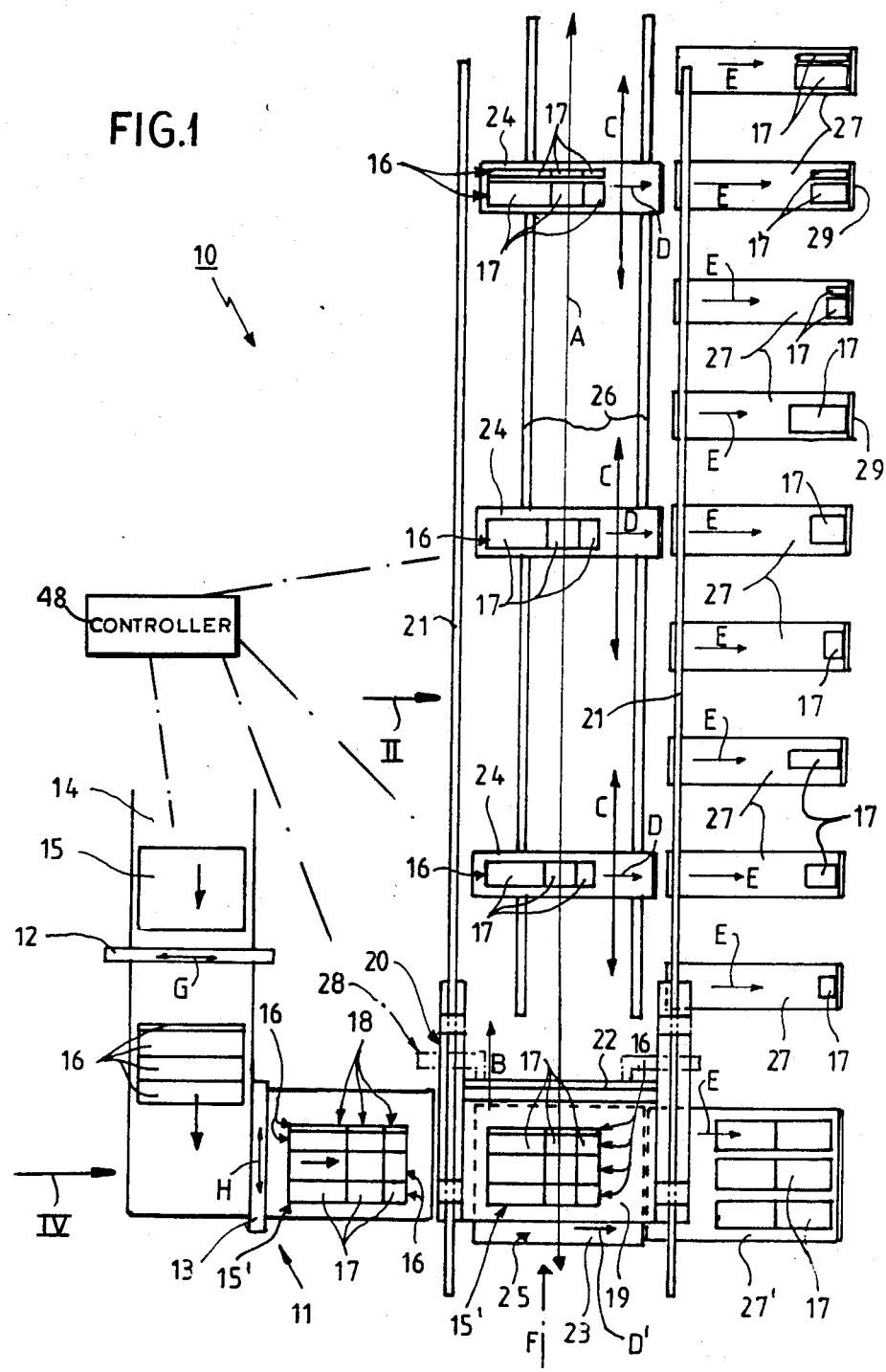
FIG. 1 is a partly diagrammatic small-scale top view of the apparatus according to this invention.

As seen in FIG. 1 a system 10 has a sawing apparatus 11 for subdividing a workpiece 15, which may be a single rectangular panel or a stack of such panels, into a plurality of pieces 17. This apparatus 11, which is also shown in FIG. 4, has an L-shaped conveyor 14 provided with a transverse sawing device 12 whose blade 12' moves in a transverse direction G relative to the direction of movement of the workpiece 15 to cut the workpiece into several strips or rows 16. The workpiece 15 is held by grippers 70 carried on a steppable carriage 69 that ensures that the workpiece 15 does not move between cuts. The strips 16 are then moved off transversely by the grippers 70 under another sawing device 13 whose blade 13' is movable in a direction H which is parallel to the original displacement direction but transverse to the current displacement direction to cut the strips 16 crosswise into strips or rows 18, thereby forming the individual pieces 17 that are all of different size and that each may be made up of a stack of identical pieces. During such second crosswise subdivision the individual strips 16 are held by further tong-type grippers 71 carried on an indexable carriage 70'. The pieces 17 form a workpiece 15' that is then moved off the apparatus 11 by the grippers 71 and the L-shaped conveyor 14 and deposited on a stripping tray 19. The carriages 69 and 70' as well as the saws 12' and 13' and the conveyor 14 are all operated by a central controller 48 connected to all of the various actuators and drives of the system and programmed to ensure synchronous operation of the various elements in the manner described herein.

Figure 2:
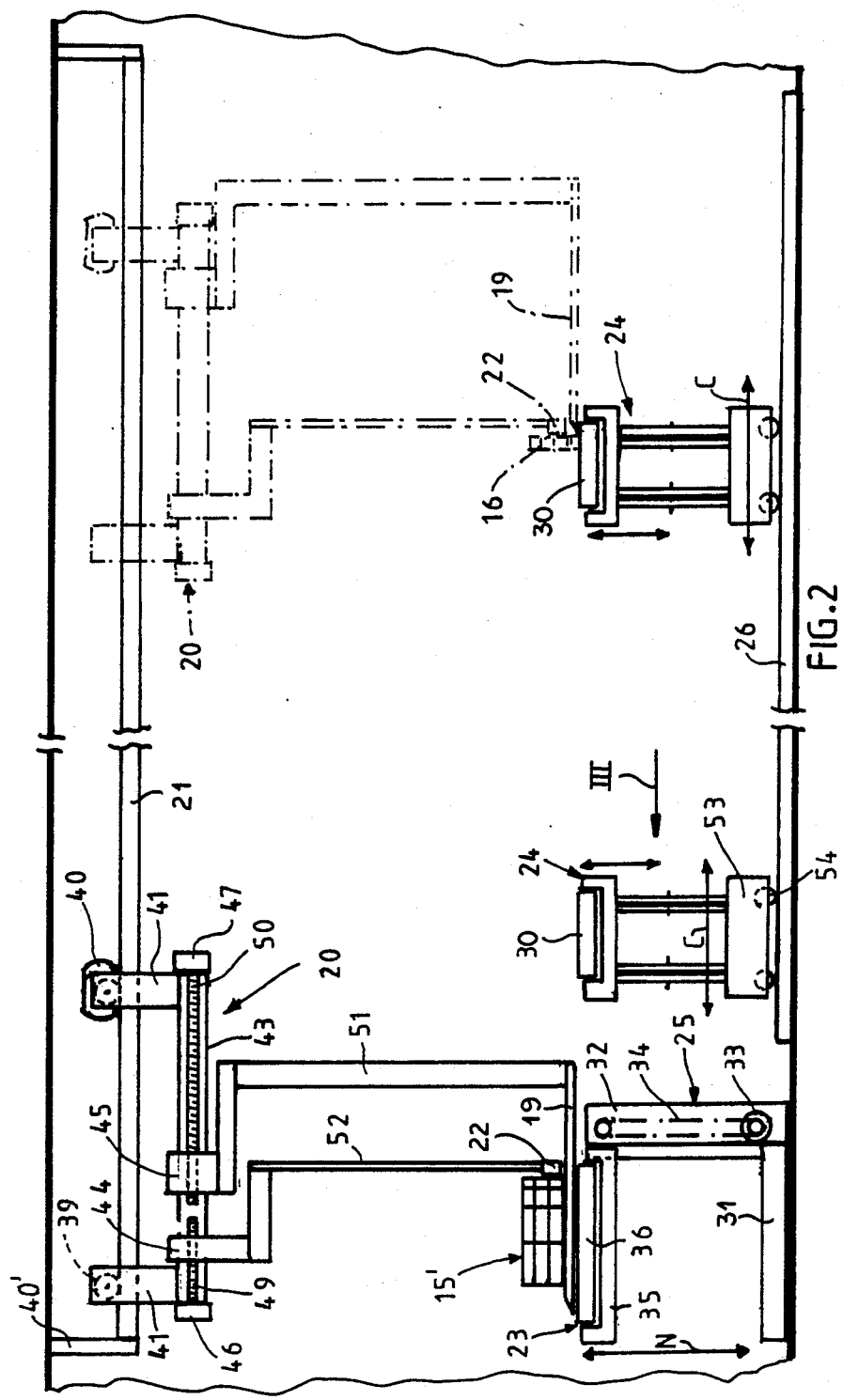
FIG. 2 is a larger-scale side view of the portion of the apparatus indicated by and taken in the direction of arrow II of FIG. 1.

The stripping tray 19 as best seen in FIG. 2 is suspended by a pair of arms 51 from a carriage 20 formed by a support 45 carried on rails 43 in turn suspended via uprights 41 from wheels 39 riding on stationary rails 21 extending in a main transport direction A past a plurality, here nine, of outfeed devices 27. A motor 47 carried on the rails 43 has a spindle 50 extending in the direction A and engaged in the support 45 so as to be able to move this tray 19 in the direction A relative to the carriage 20, and a motor 40 can move the entire carriage 20 along the rails 21 in the direction A.

Another support 44 is displaceable in a direction B parallel to the direction A on the rails 43 of the carriage 20 and has an upright 52 suspending a stripper bar 22 extending horizontally and perpendicular to the directions A and B and located just above the horizontal upper surface of the tray 19. Another motor 46 carried on the carriage 20 has a spindle 49 extending in the direction B and threaded into the support 44 so it can move this stripper bar 22 independently of and relative to the tray 19.

Underneath the tray 19 in its furthest upstream position (illustrated in solid lines in FIG. 2) is a first distributing unit 23 having a support surface 25 formed by a plurality of friction-feed rollers 36 carried on a support 35 which can be moved along an upright 32 of a frame 31 by means of a belt 34 driven by a motor 33. The surface 25 can be positioned immediately underneath the tray 19 or can be lowered by the drive 33 so that the upper surface of the uppermost workpiece is underneath the tray 19. In this manner the tray 19 can be returned to a position above the first distributor 23 before same has emptied itself of all its pieces 17 as will be described below.

As also illustrated in FIGS. 2 and 3 the system 10 has a plurality of further distributing devices 24 that are all identical and that can move in a direction C along stationary rails 26 parallel to the directions A and B. Each such device 24 comprises a carriage 53 formed by a lower housing part 60 supported by wheels 54 on the rails 26, an upper housing part 55, and criss-cross links 56 and 57 supporting the upper part 55 on the lower part 60. The centers of the links 56 and 57 are pivoted together and as seen in FIG. 3 the left-hand ends of these links 56 and 57 are pivoted at 59' on the parts 55 and 60, respectively, and the right-hand ends ride via rollers 59" on the respective parts 60 and 55. An actuator 59 linked between the lower pivot 59' and the link 56 can therefore raise and lower the upper part 55 which carries a plurality of rollers 30 driven via a common belt 62 from a motor 61 operated by the control means 48.

Each of the distributing devices 24 is associated with a group of the outfeed devices 27 which, as shown in FIGS. 1 and 3 each have a plurality of friction-feed rollers 66 carried on shafts 65 driven continuously from a chain 64 in turn driven continuously by a motor 63. Each such outfeed device 27 has a respective stop 29 and normally receives one of more of the pieces 17 which is moved in a direction D perpendicular to the directions A and B off the respective distributing devices 24. Adjacent the upstream distributing unit 27 is an outfeed device 27' identical to the devices 27 but somewhat wider transverse to the direction E.

The apparatus described above sorts the pieces produced by the sawing apparatus 11 and delivered by the conveyor 14 to the stripping tray 19 as follows:

(In the following discussion the term "longitudinal" will be used to refer to the horizontal direction of displacement parallel to the directions A, B, and C and "transverse" to the direction parallel to the directions D and E. The fact that the workpiece 15 is first moved parallel to the longitudinal direction and is cut parallel to the transverse direction, and then is moved parallel to the transverse direction and cut parallel to the longitudinal direction before being moved parallel to the transverse direction and deposited on the tray is not significant. The displacement path is merely thus folded around and not, for instance, all straight, to save floor space, it merely being important that the workpiece 15' as delivered to the stripping tray 19 is formed with cuts extending both longitudinally and transversely.)

Once the workpiece 15' subdivided into the pieces 17 is on the tray 19 in the upstream distributing station defined by the unit 23 the stripping bar 22 is advanced by rotation of the motor 46 to bring it against the transverse leading (relative to the displacement upward as seen in FIG. 1 in directions A, B, and C) edge of the workpiece 15'. Subsequent movement of the tray 19 longitudinally downstream in the direction A by rotation of the motor 47 will cause this bar 22, which remains stationary, to push the furthest upstream or trailing strip 16 of pieces 17 off the upstream or trailing edge of the tray 19. The surface 25 has meanwhile been raised to its uppermost position immediately beneath the tray so that the strip 16 slides off onto it.

Thereafter the entire tray 19 is moved downstream by action of the motor 40, with the leading edge of the remaining workpiece 15' still bearing on the bar 22 and the trailing edge of the remaining workpiece 15' just at the trailing edge of the tray 19. As soon as the trailing row of pieces 17 is dropped on the unit 23 and even before the tray 19 starts to move downstream, the drive 33 can start dropping the table 23 to the level of the first distributing device 27' and the drive for its rollers 36 can then be operated to shift the pieces 17 deposited on it off in the transverse direction E. As shown in FIG. 1 it is possible for the strips or rows 16 or pieces 17 to be set at a slight offset from one another by shifting the entire carriage 20 slightly while relatively moving the table 19 and bar 22.

The carriage 20 meanwhile moves longitudinally downstream and deposits a strip 16 of the pieces 17 on each of the distributing units 24 or on whichever of the units 24 the controller 48 is programmed to load. As soon as each such unit 24 has its respective row of pieces, it drops down to the level of the respective outfeed units 17 and sets its drive 61 in action to deposit the first piece 17 on one of the units, then shifts downstream to deposit the next piece 17 on the next unit 27, and so on. It is also possible as shown for the furthest downstream units for each unit 24 to receive two strips and to deposit pieces 17 two at a time on its respective outfeed units 27.

Thus with the system of this invention the instant a strip 16 is deposited on one of the distributing units 23 or 24 it can start to be broken up into individual pieces, even before the next strip 16 is deposited on the next distributing unit. The fact that the outfeed conveyors 27 and 27' are lower than the path along which the stripping tray 19 travels makes it possible for this tray 19 to return to its upstream position even before the units 24 have finished dropping off the pieces to the respective outfeed conveyors 27. The result is therefore and extremely fast cycling time, as the tray 19 can be reloaded merely in the time it takes it to drop off a certain number of rows or strips of pieces 17, and the actual distribution of these pieces 17 to their individual destination can be taking place simultaneously for several pieces at the same time.

This system is completely flexible. The controller 48 can distribute each and every piece to a separate outfeed unit, if desired, or can distribute any number of adjacent pieces to the same outfeed unit, in virtually any combination. The furthest upstream distributing unit 23 is sufficiently wide to accept the entire workpiece 15' but the others are substantially narrower, so that it is even possible to drop the entire subdivided workpiece 15' in one location.

I claim:
1. An apparatus for sorting individual pieces of a subdivided plate workpiece from one another and for delivering the individual pieces to respective different destinations, the apparatus comprising:
   a stripping tray displaceable in a longitudinal direction along a distributing path between an upstream end and a downstream end;
   means for depositing on the stripping tray a workpiece subdivided into a plurality of pieces ordered in closely juxtaposed transverse rows extending generally perpendicular to the direction;
   a stripping bar vertically closely juxtaposed with the tray and extending transversely across the tray immediately downstream of the subdivided workpiece;
   a plurality of distributing units spaced longitudinally along the path and each having an upper surface positioned in an upper position immediately beneath the level of the stripping tray, the stripping tray being displaceable past and over the distributing units;
   a plurality of longitudinally spaced takeoff conveyors adjacent the path and having upper surfaces, the upper surfaces of the distributing units being alignable with the upper surfaces of the respective takeoff conveyors;
   actuator means for relatively longitudinally displacing the tray and the stripping bar for engaging the stripping bar against the leading edge of the leading and furthest downstream transverse row of pieces and for pushing the subdivided workpiece on the tray toward and past the trailing upstream edge of the stripping tray, whereby when the upstream tray end is above one of the distributing-unit upper surfaces the upstream and trailing row of pieces is thereby deposited thereon;
   control means for connection to the stripping tray, bar, units, conveyors, and actuator means for positioning the upstream edge of the stripping tray above the upper surfaces of the units and thereafter relatively displacing the tray and bar to push the upstream transverse rows off onto the unit upper surfaces; and
   means in the units for displacing the respective upper surfaces toward the takeoff conveyors after deposition of rows of pieces thereon for moving the respective rows of pieces from the units to the conveyors.

2. The apparatus defined in claim 1 wherein the upper surfaces of the takeoff conveyors are lower than the upper surfaces of the units in the upper position, the unit upper surfaces being displaceable into a lower position level with the surfaces of the conveyors, the units comprising means connected to the control means for displacing the respective upper surfaces into the lower positions after receiving a row of the pieces.

3. The apparatus defined in claim 2 wherein for at least one of the distributing units there are a plurality of such takeoff conveyors and the one distributing unit is displaceable longitudinally between positions aligned transversely with the respective takeoff conveyors, the apparatus further comprising actuator means connected to the control means and to the one distributing unit to align same with the respective takeoff conveyors and move the upper surface of the one unit to move the respective pieces one each to the respective takeoff conveyors.

4. A method of sorting individual pieces of a subdivided plate workpiece from one another and for delivering the individual pieces to respective different destinations, the apparatus comprising:
 (a) depositing on a stripping tray at an upstream end of a longitudinal path a workpiece subdivided into a plurality of pieces ordered in closely juxtaposed transverse rows extending generally perpendicular to the direction;
 (b) positioning an upstream edge of the tray carrying the subdivided workpiece above an upper surface of one of a plurality of distributing units spaced longitudinally along the path and then shifting a stripping bar vertically closely juxtaposed with the tray and extending transversely across the tray immediately downstream of the subdivided workpiece into engagement with the leading edge of the subdivided workpiece on the tay to slide the trailing row of pieces off the tray onto the surface positioned thereunder;
 (c) displacing the tray downstream and stopping it with its trailing edge above each of the other distributing units thereon and repeating step (b) to deposit on each of the units a respective row of the pieces; and
 (d) immediately after each unit receives the respective row of pieces, vertically shifting the upper surface of each unit from an upper position immediately beneath the level of the stripping tray to a lower position and then shifting the upper surface transversely to displace at least one of the respective row of pieces transversely and transfer same to respective longitudinally spaced takeoff conveyors adjacent the path and having upper surfaces at the lower level.

5. The method defined in claim 4 wherein for at least one of the distributing units there are a plurality of such longitudinally spaced takeoff conveyors, the method further comprising the steps of:
 (e) transferring only a single piece of the respective row from the one unit onto one of the respective conveyors;
 (f) thereafter longitudinally displacing the one unit to another of the respective conveyors and transferring the next piece of the respective row thereto; and
 (g) repeating step (f) with each of the succeeding respective conveyors until all of the respective pieces have been transferred to respective conveyors.

* * * * *